UNITED STATES PATENT OFFICE.

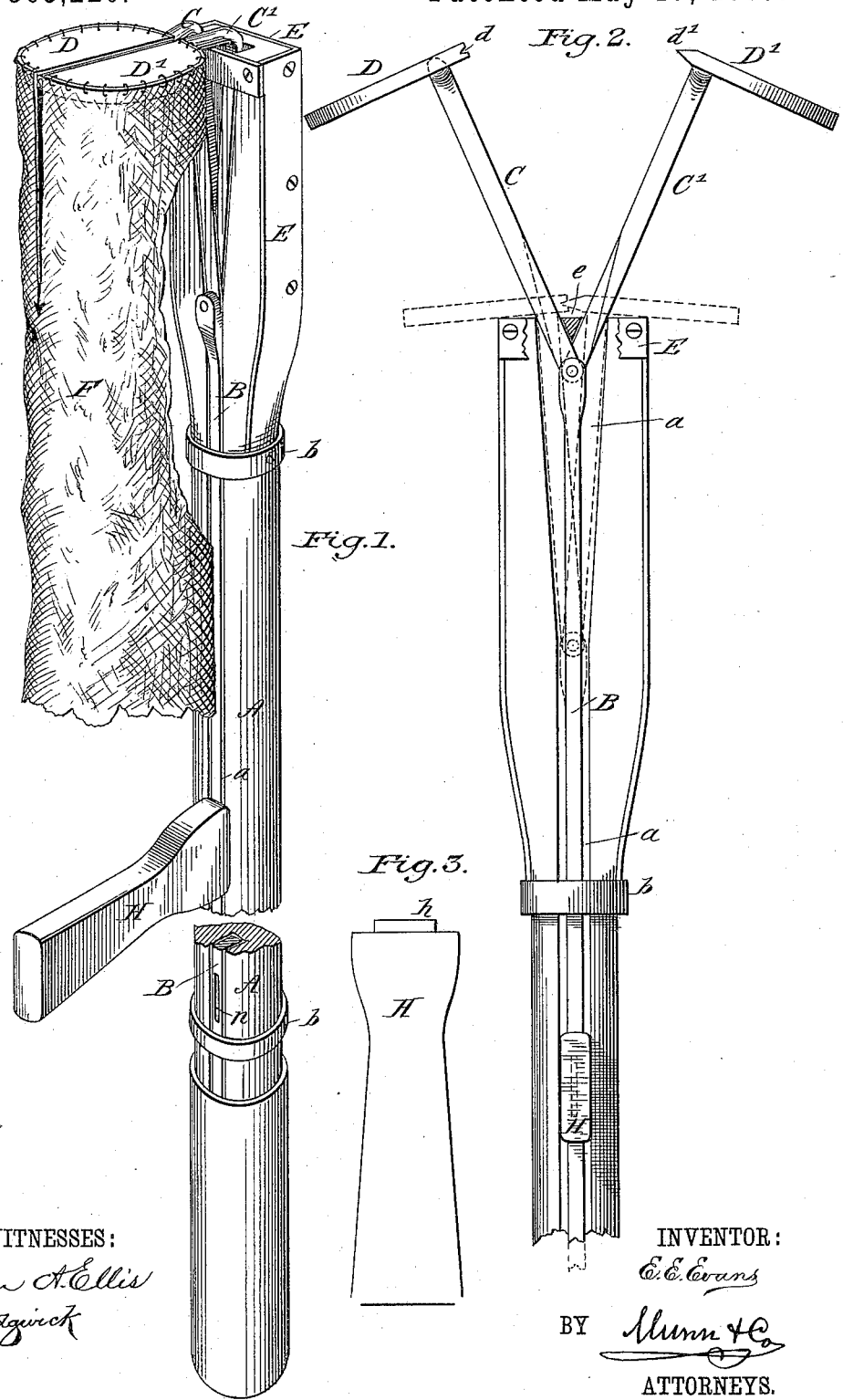

EUGENE E. EVANS, OF CRYSTAL SPRINGS, MISSISSIPPI.

FRUIT-GATHERER.

SPECIFICATION forming part of Letters Patent No. 363,220, dated May 17, 1887.

Application filed July 31, 1886. Serial No. 209,687. (No model.)

*To all whom it may concern:*

Be it known that I, EUGENE E. EVANS, a citizen of the United States, residing at Crystal Springs, in the county of Copiah and State of Mississippi, have invented a new and useful Improvement in Fruit-Gatherers, of which the following is a full, clear, and exact description.

My invention relates to fruit-gatherers, and has for its object to provide a light portable gatherer of suitable size for use in any fruit-tree, whereby the fruit may be harvested without injury to either tree or fruit, and whereby any known fruit may be brought from the top of a tree to the ground or hand of the operator in as good condition as when plucked from the tree by hand.

The invention consists in the construction and combination of the several parts, as will be hereinafter fully set forth, and pointed out in the claim.

Reference is to be had to the accompanying drawings, forming a part of this specification, in which similar letters of reference indicate corresponding parts in all the figures.

Figure 1 is a perspective view of the fruit-gatherer with the jaws closed. Fig. 2 is a front elevation of the same with the jaws open, and Fig. 3 a detail view of the handle.

A represents a pole of hard light wood, preferably circular in form to a point near its outer or upper end, thence enlarged, and constructed with flat sides and edges. Centrally upon one side of the said pole a groove, $a$, is provided, adapted to extend from near the lower end or handle outward through the upper end, the said groove being made to diverge in a V shape in its passage along the aforesaid flat side of the extended upper end of the pole.

An iron or steel rod, B, is held to slide in the groove $a$ by means of a series of metallic bands, $b$, secured to and encircling the pole. The said rod B is made to terminate, when in its normal position, at the diverging point of the groove $a$, with a re-enforced forked end, in which short arms C C' are pivoted by the same pivotal bolt, the free ends of said arms being bent outward at right angles over the outer or upper end of the pole A, and united to semi-circular cutting-plates D D'. The straight edge of one of the plates, D', is formed with a cutting-edge, $d'$, while the opposite straight edge of the plate D is provided with an angular groove, $d$, adapted to receive the same.

A wrought-iron cap, E, provided with a central triangular cross-piece, $e$, is now fitted over the outer end of the pole A, to perform the dual functions of a guide to the short arms C C' and a brace and stay for the upper portion of the pole, as the said cap extends downward upon three sides thereof, and is connected with the uppermost band or ring $b$, above referred to.

A flexible tube, F, preferably made of canvas or cotton, about three or four feet longer than the pole A, open at its lower end, and slitted a short distance at its upper end, is secured to the semicircular plates D D' by cording or wire passed through the said tube, near its upper edge, and also through apertures cut near the circular edges of the plates for that purpose. The purpose of the aforesaid tube F is to receive and conduct the fruit gathered to the ground or hand of the operator, as found most desirable.

In the face of the sliding rod B, at intervals in its length, slots $n$ are cut adapted to receive the central projection, $h$, of the detachable handle H, as shown in Fig. 3.

The pole A is made long enough to reach the upper branches of ordinary-sized fruit-trees, and the slots $n$ are cut at such intervals apart in the rod B as to be always within easy reach when it is desired to raise or lower the knife-plates by means of the detachable handle H engaging said slots.

In operation the gatherer with the cutting-plates closed, as in Fig. 1, is hoisted up among the branches of a tree. When near the hanging fruit the operator inserts the offset $h$ of the handle H in the most convenient slot in the sliding rod B, and by means of said handle pushes the said sliding rod upward, causing thereby the pivoted arms C C', carrying the cutting-plates D D' and the flexible tube F, to extend upward and outward above the outer end of the pole A, as shown in Fig. 2. The fruit is now covered within the outstretched cutting-plates and tube, and upon the handle H being drawn downward the stem is cut by the edge $d'$ closing in the groove $d$ as the plates D D' return to their normal position. The fruit is thereupon conducted gently to the ground or hand of the operator through the tube F, as he may select.

I am aware that it is not new in fruit-gatherers to employ two pivoted plates in plucking fruit from the branches of a tree, operated by a rod sliding in the handle of the gatherer and delivering the fruit to a bag or tube, and from thence to the ground or operator's hand, as shown in Letters Patent granted to J. M. Kent, October 26, 1880, and I do not broadly claim such construction. In Kent's patent, however, the movement of the sliding rod produces two movements of the pickers—first, an upward movement toward the fruit, and, second, an expansive movement to receive the fruit—while in my invention the upward and expansive movements are simultaneously made. Further, in Kent's invention the downward movement of the sliding rod also produces two distinct movements of the pickers—first it closes them, and then they descend, carrying the fruit into a receptacle, which receptacle is independent of the pickers. In my invention the downward movement of the sliding rod causes the pickers to cut the stem of the fruit, whereupon the fruit drops into a flexible tube attached to the pickers, which tube conducts the fruit as desired.

Having thus described my invention, what I claim as new, and desire to secure by Letters Patent, is—

The combination, with the pole A, having a groove, a, cut therein, enlarged at its upper end, and annular bands b, encircling said pole, together with a cap, E, having a triangular cross-piece, e, of the apertured sliding rod B, detachable handle H, pivoted arms C C', semicircular cutting-plates D D', attached to said arms, and a flexible tube, F, attached to said plates, all arranged to operate substantially as shown and described.

EUGENE E. EVANS.

Witnesses:
H. WICKIZER,
A. C. RAY.